United States Patent
Yurchenko et al.

(10) Patent No.: US 11,481,440 B2
(45) Date of Patent: Oct. 25, 2022

(54) SYSTEM AND METHOD FOR PROCESSING METADATA TO DETERMINE AN OBJECT SEQUENCE

(71) Applicant: salesforce.com, inc., San Francisco, CA (US)

(72) Inventors: Kirill Yurchenko, Mountain View, CA (US); James Arthur Farley, Walnut Creek, CA (US)

(73) Assignee: salesforce.com, inc., San Francisco, CA (US)

(*) Notice: Subject to any disclaimer, the term of this patent is extended or adjusted under 35 U.S.C. 154(b) by 619 days.

(21) Appl. No.: 14/954,547

(22) Filed: Nov. 30, 2015

(65) Prior Publication Data
US 2017/0154123 A1     Jun. 1, 2017

(51) Int. Cl.
| G06F 16/901 | (2019.01) |
| G06F 16/21 | (2019.01) |
| G06F 16/25 | (2019.01) |
| G06F 16/27 | (2019.01) |

(52) U.S. Cl.
CPC ........ *G06F 16/9024* (2019.01); *G06F 16/214* (2019.01); *G06F 16/254* (2019.01); *G06F 16/278* (2019.01)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |

(Continued)

*Primary Examiner* — Neveen Abel Jalil
*Assistant Examiner* — John J Morris
(74) *Attorney, Agent, or Firm* — LKGlobal | Lorenz & Kopf, LLP

(57) ABSTRACT

In one embodiment, a computer-implemented method executable by a computer to process metadata of a data source is provided. The method includes: processing, by a processor of the computer, the metadata to determine a graph of nodes and edges; converting, by the processor of the computer, the graph from a cyclic graph to an acyclic graph; converting, by the processor of the computer, the acyclic graph to a listing; performing, by the processor of the computer, a topological sort on the listing; and generating a report that includes the sorted listing.

18 Claims, 3 Drawing Sheets

(56) References Cited

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,499,037 B1 * | 12/2002 | Breitbart ........... G06F 17/30575 |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,171,102 B1 * | 10/2015 | Zlatnik ............... G06F 16/9024 |
| 2001/0044791 A1 * | 11/2001 | Richter ............... G06F 17/3071 |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0262470 A1 * | 11/2005 | Gavrilov ............ G06F 16/9024 717/100 |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0241637 A1 * | 9/2010 | Kissner ............. G06F 16/24565 707/752 |
| 2011/0247051 A1 | 10/2011 | Bulumulla et al. |
| 2012/0042218 A1 | 2/2012 | Cinarkaya et al. |
| 2012/0079502 A1 * | 3/2012 | Kwan ..................... G06F 8/71 718/106 |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0302113 A1 * | 10/2015 | Rosenberg ............ G06F 16/211 707/722 |

* cited by examiner

SYSTEM AND METHOD FOR PROCESSING METADATA TO DETERMINE AN OBJECT SEQUENCE

TECHNICAL FIELD

Embodiments of the subject matter described herein relate generally to methods and systems for processing metadata. More particularly, embodiments of the subject matter relate to methods and systems for processing metadata to determine an object sequence.

BACKGROUND

Certain database systems host a plethora of metadata. For example, the metadata can relate to individuals, entities, and/or multiple entities associated with multiple individuals. The metadata may be interrelated. The metadata may be continuously evolving. Such metadata having a large volume, having varying relationships, and/or that are continuously evolving is considered as complex metadata.

In certain instances, it is desirable to make copies of, move, or further process the complex data that is described by this metadata. In order to perform such operations on the data, a sequence of objects defined in the metadata must be known such that the relationships and dependencies can be properly maintained. The amount of effort and time that it takes to process the sequencing grows exponentially depending on the amount and complexity of the relationships described by the metadata.

Accordingly, it is desirable to provide automated processing methods and systems for processing metadata to determine an object sequence. Furthermore, other desirable features and characteristics will become apparent from the subsequent detailed description and the appended claims, taken in conjunction with the accompanying drawings and the foregoing technical field and background.

SUMMARY

In one embodiment, a computer-implemented method executable by a computer to process metadata of a data source is provided. The method includes: processing, by a processor of the computer, the metadata to determine a graph of nodes and edges; converting, by the processor of the computer, the graph from a cyclic graph to an acyclic graph; converting, by the processor of the computer, the acyclic graph to a listing; performing, by the processor of the computer, a topological sort on the listing; and generating a report that includes the sorted listing.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
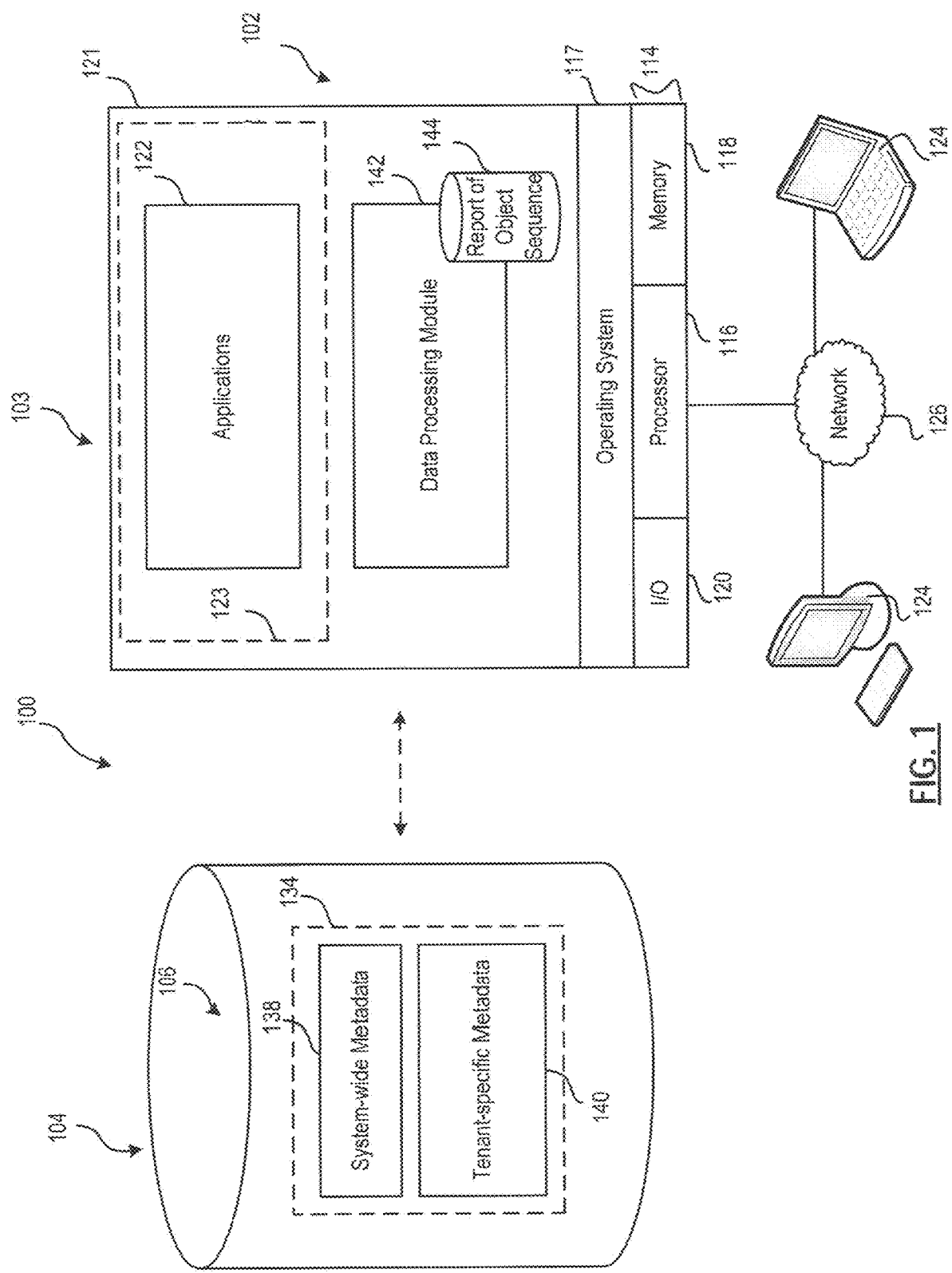
FIG. 1 is a block diagram of an exemplary data processing system having a data processing module in accordance with various embodiments.

The following detailed description is merely exemplary in nature and is not intended to limit the disclosure the application and uses of the disclosure. Furthermore, there is no intention to be bound by any expressed or implied theory presented in the preceding technical field, background, brief summary or the following detailed description. It should be understood that throughout the drawings, corresponding reference numerals indicate like or corresponding parts and features.

The exemplary embodiments presented herein relate to a metadata processing system and related techniques, methodologies, procedures, and technology for processing metadata to determine an object sequence. As can be appreciated, the described subject matter can be implemented in the context of various environments. For exemplary purposes, the subject matter is described in the context of a computer-implemented environment relating to, for example, software products for a software-based system, a database system, a multi-tenant environment, or the like. Moreover, the described subject matter can be implemented in connection with a single computer-implemented system or two or more separate and distinct computer-implemented systems that cooperate and communicate with one another.

In accordance with exemplary embodiments described below, a computer based system is provided, such as a multi-tenant system that is used to provide a service to a plurality of different tenants, a plurality of different end users, and/or a plurality of different tenant applications. The multi-tenant system stores a plethora of metadata that is used for generating one or more virtual applications for servicing the plurality of different tenants, the plurality of different end users, and/or the plurality of different tenant applications. The metadata may be defined by administrators of the multi-tenant system and/or may be created by a user using the multi-tenant system. Depending on the number of tenants in the system and the number of applications of the multi-tenant system, the volume of stored metadata for one tenant or for all tenants can be large and the metadata and relationships of the metadata can complex. The data processing system processes this metadata to determine a sequence of the objects defined by the metadata. This object sequence can be used, for example, when migrating all or parts of the data described by metadata to a new system, making a copy of the full set or subset of data, or for other processing techniques. As can be appreciated, the metadata described herein as being associated with a multi-tenant database system is merely one example of complex metadata. The computer based system of the present disclosure can be implemented for any set of metadata and is not limited to the present examples.

Turning now to FIG. 1, an exemplary computing system 100 having a data processing system 102 is shown in accordance with various embodiments. The computing system 100 generally includes at least one server 103 that is associated with at least one data source 104. In accordance with various non-limiting examples, the system 100 may be implemented in the form of a multi-tenant customer relationship management system that can support any number of authenticated users of multiple tenants. A "tenant" or an "organization" generally refers to a group of users that shares access to data 106 within the data source 104. Tenants may represent customers, customer departments, business or legal organizations, and/or any other entities that maintain data for particular sets of users within the system 100. Although multiple tenants may share access to the server 103 and the data source 104, the particular data and services provided from the server 103 to each tenant can be securely isolated from those provided to other tenants. The multi-tenant architecture therefore allows different sets of users to share functionality while managing the sharing of any or none of the data 106. The users and/or tenants share access through one or more user devices 124 such as virtual machines or other computing devices that communicate with the server 103 via a network 126.

The server 103 generally includes any sort of conventional processing hardware 114, such as a processor 116, memory 118, input/output features 120 and the like, that are managed and accessed by a suitable operating system 117. The processor 116 may be implemented using one or more of microprocessors, microcontrollers, processing cores and/or other computing resources spread across any number of distributed or integrated systems, including any number of "cloud-based" or other virtual systems. The memory 118 represents any non-transitory short or long term storage capable of storing programming instructions for execution on the processor 116, including any sort of random access memory (RAM), read only memory (ROM), flash memory, magnetic or optical mass storage, and/or the like. The input/output features 120 represent conventional interfaces to networks (e.g., to the network 126, or any other local area, wide area or other network), mass storage, display devices, data entry devices and/or the like. As can be appreciated, the server 103 may be implemented using a cluster of actual and/or virtual servers operating in conjunction with each other, typically in association with conventional network communications, cluster management, load balancing and other features as appropriate.

The server 103 typically includes or cooperates with some type of computer-readable media 121, where a tangible computer-readable medium has computer-executable instructions stored thereon. The computer-executable instructions, when read and executed by the server 103, cause the server 103 to perform certain tasks, operations, functions, and processes described in more detail herein. In this regard, the memory 118 may represent one suitable implementation of such computer-readable media. Alternatively or additionally, the server 103 could receive and cooperate with computer-readable media (not separately shown) that is realized as a portable or mobile component or platform, e.g., a portable hard drive, a USB flash drive, an optical disc, or the like.

The server 103, as shown, further includes an application platform 123 and that may be any sort of software application or other data processing engine that generates virtual applications 122 that provide data and/or services to user devices 124. The virtual applications 122 are typically generated at run-time in response to queries received from the user devices 124. The user devices 124 are typically operated by various tenants that subscribe to the system 100 and that access the system 100 via the network 126. The virtual applications 122 are typically built by a user based on metadata constructs. For example, the virtual applications 122 created by or for the tenants may be constructed in accordance with metadata 134, which describes particular tables, reports, interfaces and/or other features of the particular application and which may be stored in the data source 104.

The data source 104 is any sort of repository or other data storage system capable of storing and managing the data 106 associated with any number of tenants. The data source 104 may be implemented using any type of conventional database server hardware. In various embodiments, the data source 104 shares processing hardware 114 with the server 103. In other embodiments, the data source 104 is implemented using separate physical and/or virtual database server hardware that communicates with the server 103 to perform the various functions described herein.

In various embodiments, the data source 104 stores the metadata 134 used to create the virtual applications 122. The metadata 134 may be organized and formatted in any manner to support the application platform 123. In various embodiments, the metadata 134 is suitably organized into a relatively small number of large data tables to maintain a semi-amorphous "heap"-type format. The metadata 134 can then be organized as needed for a particular virtual application 122. In various embodiments, conventional data relationships are established using any number of pivot tables that establish indexing, uniqueness, relationships between entities, and/or other aspects of conventional database organization as desired.

In various embodiments, the metadata 134 can include system-wide metadata 138 and tenant-specific metadata 140. The system-wide metadata 138 can be used to describe any number of forms, reports, workflows, user access privileges, business logic and other constructs that are common to multiple tenants. The tenant-specific metadata 140 can include formatting, functions and other constructs built for each tenant, as desired.

Rather than forcing the data 106 into an inflexible global structure that is common to all tenants and applications, the data source 104 is organized to be relatively amorphous, with the metadata 134 providing additional structure on an as-needed basis. To that end, the application platform 123 suitably uses the metadata 134 to generate "virtual" components of the virtual applications 122 to logically obtain, process, and present the relatively amorphous data 106 from the data source 104.

In various embodiments, the computer-readable media 121 associated with the server 103 includes a data processing module 142 in accordance with the present disclosure. The data processing module 142 includes computer-executable instructions that, when executed by the processor 116 of the server 103, process the metadata 134 of the data source 104 to determine an object sequence 144. The object sequence 144 provides an order or sequence of the objects. In various embodiments, the data processing module 142 analyzes the metadata 134 for a particular tenant and/or for multiple tenants. In various embodiments, the data processing module 142 can be implemented as a stand-alone application that may be accessed by certain users or as an application 122 that may be accessed by any user. For example, the data processing may be used to determine the object sequence 144 for single tenant metadata; and data migration can be conducted between tenants that both utilize metadata to describe corresponding configurations.

In various other embodiments, the data processing module 142 resides on a user device 124 having a computer readable media (not shown) and a processor (not shown). In such embodiments, the data processing module 142 is included in the computer readable media of the user device 124 and includes computer-executable instructions that, when executed by the processor of the user device 124, process the metadata 134 of the data source 104 to determine the object sequence. As can be appreciated, in such embodiments, the data source 104 may be part of the server 103, may be a part of the user device 124, or partially part of the server 103 and partially part of the user device 124.

Figure 2:
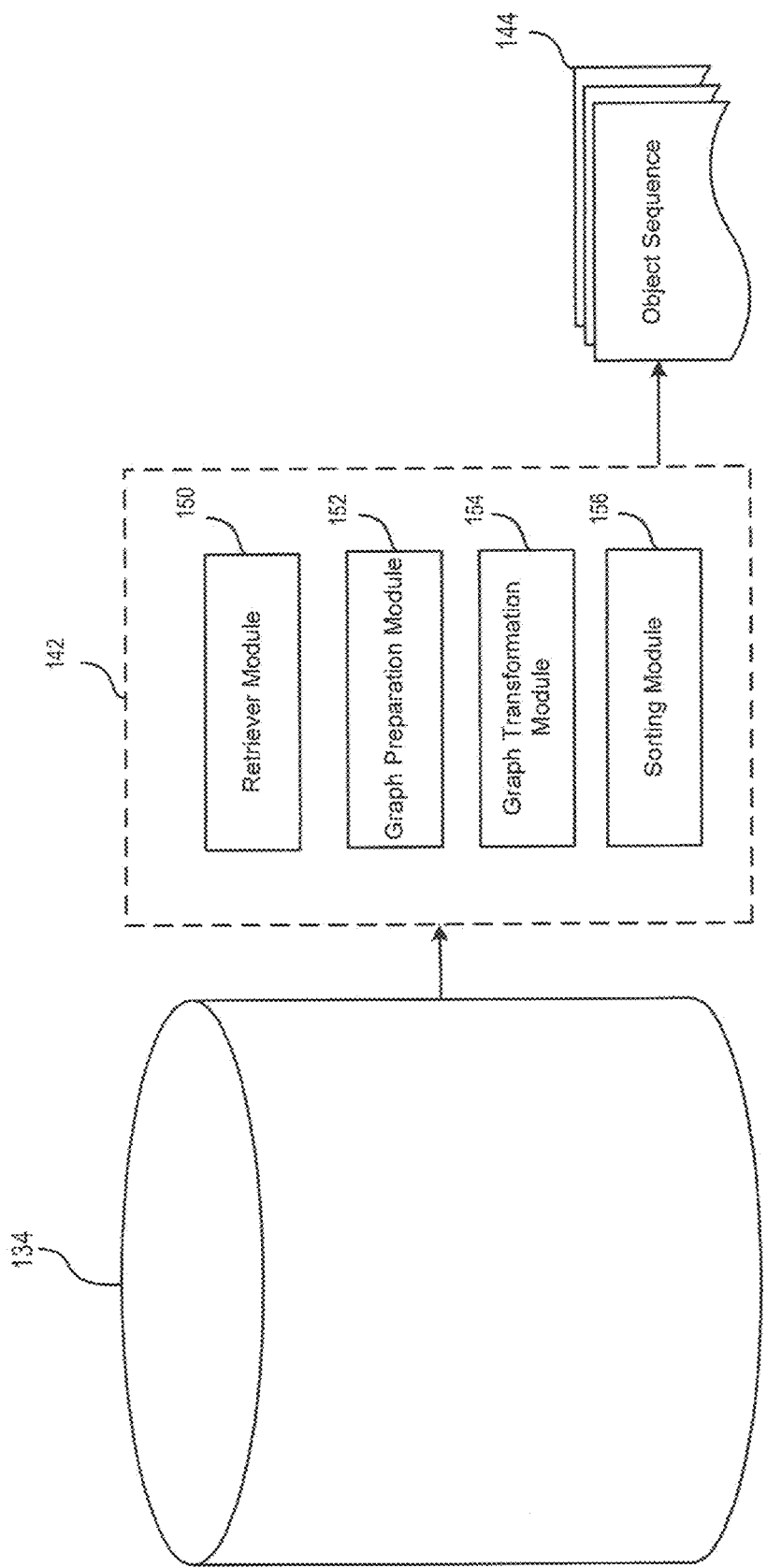
FIG. 2 is a dataflow diagram illustrating a data processing module in accordance with various embodiments.

Referring now to FIG. 2 and with continued reference to FIG. 1, a block diagram illustrates in more detail an exemplary data processing module 142 suitable for use in a computer-implemented server system such as the system 100 shown in FIG. 1. As can be appreciated, various exemplary embodiments of the data processing module 142, according to the present disclosure, may include any number of sub-modules. In various exemplary embodiments, the sub-modules shown in FIG. 2 may be combined and/or further partitioned to process the objects containing the data records. In various exemplary embodiments, the data processing module 142 includes a retriever module 150, a graph preparation module 152, a graph transformation module 154, and a sorting module 156.

The retriever module 150 selectively retrieves all or parts of the metadata 134 from the data source 104. For example, the retriever module 150 retrieves the metadata 134 based on user defined parameters indicating which metadata 134 to retrieve (e.g., system-wide metadata, tenant-specific metadata, or parts thereof). The retriever module 150 processes the retrieved metadata 134 to create a listing of data objects defined in the metadata 134. The metadata objects for a multi-tenant server system can include, for example, but are not limited to, Account, Contact, Order Item, Case, Case Notes, etc.

In various embodiments, one or more of the defined data objects may be related to other defined data objects based on corresponding metadata that describes the objects. The retriever module 150 includes the object name and the relationships in the listing. All or part of the other metadata associated with the object can be excluded from the listing or reformatted to improve subsequent processing.

The graph preparation module 152 evaluates each object of the listing and the relationships defined in the listing to determine nodes and edges. In various embodiments, the nodes represent a data object; and the edges represent the relationships between the data objects. In various embodiments, the edges can be defined to include a direction which indicates a direction of the relationships between the objects. The graph preparation module 152 then creates a directed graph based on the determined nodes, edges, and relationships.

The graph transformation module 154 analyzes the directed graph to determine cycles or cyclic dependencies (e.g., where the sequence starts and ends at the same node). If one or more cyclic dependencies are found, the graph transformation module 154 transforms the directed graph from a cyclic directed graph to an acyclic directed graph. For example, in various embodiments, the graph transformation module 154 performs a depth-first search on the nodes in the graph, and searches for edges that point to an ancestor of the current node. The graph transformation module 154 determines the cyclic dependencies based on these identified edges. The graph transformation module 154 then determines which cycles to break and/or which cycles to remove. The graph transformation module 154 breaks the cycles, for example, by removing an edge of the cycle. The cycle can be broken, for example, right before the end of the cycle or at a determined point between the beginning and the end. In another example, the graph transformation module 154 removes the cycle (including each node in the cycle) from the directed graph and temporarily stores the removed cycle for later processing. The edges that are chosen to be removed first are the ones that point from the object with the highest number of edges pointing to other nodes (Objects). This helps to solve loading bottlenecks and to improve data loading performance by choosing objects with the most dependencies to be loaded first (although partially) such that they can be referenced by other objects.

The sorting module 156 processes the directed acyclic graph to determine the object sequence. For example, the sorting module de-normalizes the data in the directed acyclic graph to produce a listing of nodes, where each listing includes a single node with a directed edge that points to the referenced object. The sorting module 156 then performs a topological sort on the nodes in the listing.

If cycles were removed from the directed cyclic graph by the graph transformation module 154, then the sorting module performs a second pass on the sorted listing using the information from the cycles that were temporarily stored. For example, during the second pass, the sorting module 156 updates any relationships in the listing. For example, the objects that are in the sorted listing represent an object insert sequence. The list of the references that were removed to resolve the cycles are then used in the second pass to perform an update operation on the fields that represent references to the other objects.

The sorting module 156 then produces a report indicating the updated sequence of objects to be inserted. The report can be used to automate migration of the data 134 to a new data source (not shown), make a copy of the data 134, or for other processing techniques.

Figure 3:
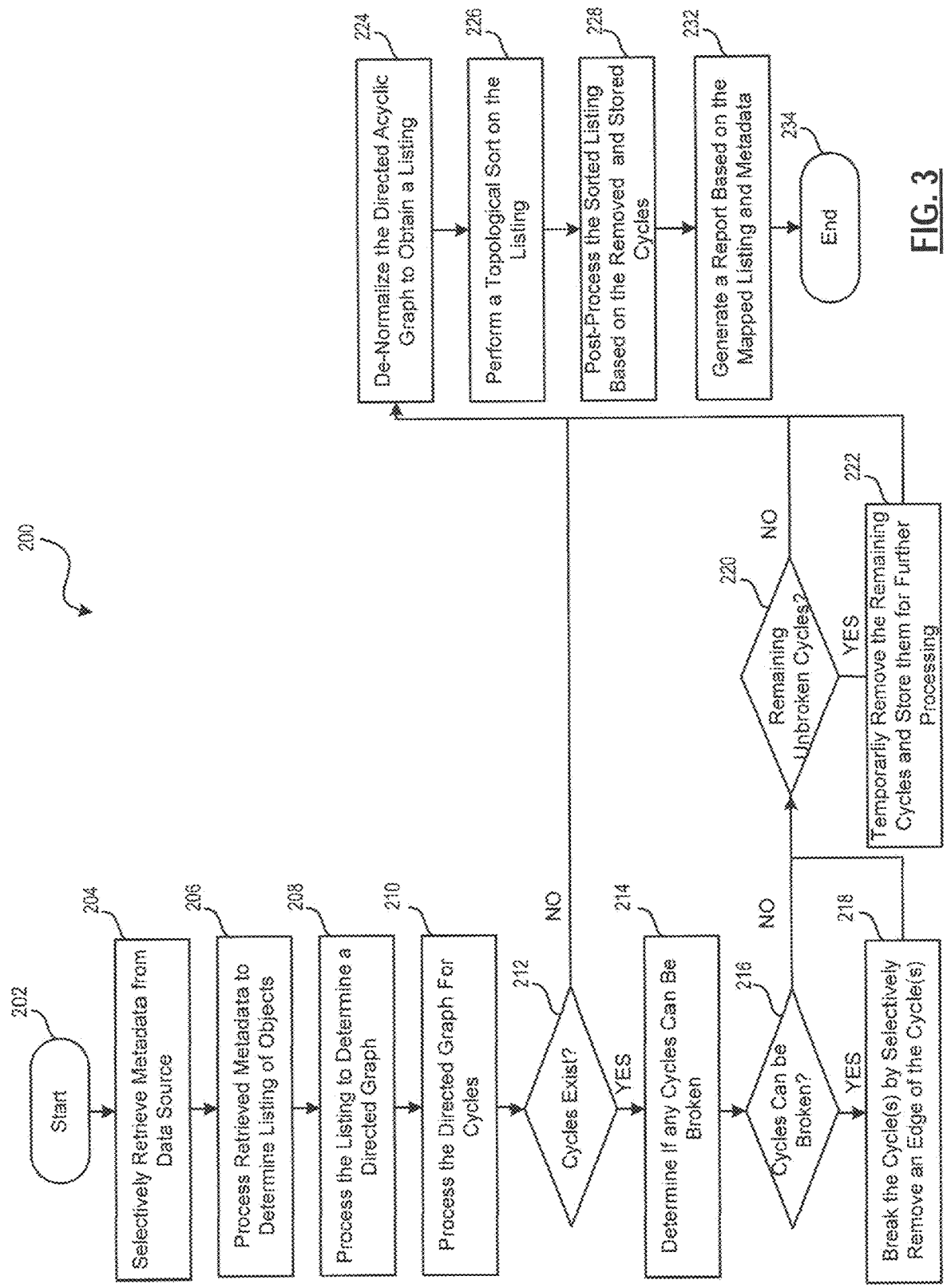
FIG. 3 is a flowchart illustrating a data processing method in accordance with various embodiments.

Turning now to FIG. 3 and with continued reference to FIGS. 1 and 2, a flowchart illustrates an exemplary method of processing metadata 134 to determine the sequence of objects. The various tasks performed in connection with the method may be performed by software, hardware, firmware, or any combination thereof. In other words, the method may represent a computer-implemented method to process metadata. In particular, the method is executable by a suitably configured server system or a functional module of a server system, such as the system 100 described above. For illustrative purposes, the following description of the method may refer to elements mentioned above in connection with FIGS. 1-2. In practice, portions of the method may be performed by different elements of the described system. As can be appreciated, the method may include any number of additional or alternative steps, the steps shown in FIG. 3 need not be performed in the illustrated order, and the method may be incorporated into a more comprehensive procedure or process having additional functionality not described in detail herein. Moreover, one or more of the steps shown in FIG. 3 could be omitted from embodiments of the method as long as the intended overall functionality remains intact.

With reference to FIG. 3 and with continued reference to FIGS. 1-2, a method 200 of processing the metadata 134 is provided. The method 200 may begin at 202 when the metadata 134 is selectively retrieved from the data source 104. The retrieved metadata 134 is then processed to determine the listing of data objects at 206. The listing is processed to determine a directed graph having nodes and edges at 208. The directed graph is processed at 210 to determine if any cycles exist. If any cycles exist at 212, the directed graph is converted from a cyclic directed graph to an acyclic directed graph at 212-222.

For example, it is determined if any of the identified cycles can be broken at 214. If one or more of the cycles can be broken at 216, then the cycle is broken by removing a selected edge at 218. Thereafter or if no cycles can be broken at 216, if any remaining cycles exist at 220, the remaining cycles are removed from the graph and temporarily stored for further processing at 222.

Once the directed graph is an acyclic directed graph, either by not having any cycles at 212 or by removing the cycles at 214-222, the acyclic directed graph is de-normalized to obtain a listing of the objects at 224. A topological sort is then performed on listing at 226. If any cycles were temporarily stored at process step 222, the list is updated with the list of references to the objects that were deleted to resolve the cycles. This list will be used for the second update pass after all the objects are inserted during the first pass at 228. The report is generated from the sorted listing that indicates an object sequence at 232. Thereafter, the method may end at 234.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method executable by a computer having a processor to automatically process a series of interrelated objects in an original database that are described by metadata of a data source to thereby automatically migrate a portion of the original database to a separate database, the method comprising:

receiving, by the computer, the metadata of the original database from the data source, wherein the metadata describes an extracted portion of the original database that is being extracted to the separate database;

creating, by the processor of the computer, a cyclic directed graph of the original database based upon the metadata;

automatically identifying, by the processor of the computer based upon the cyclic directed graph, nodes in the metadata that represent objects and edges in the metadata that represent dependent relationships between the objects in the extracted portion of the original database;

automatically evaluating the edges of the cyclic directed graph by the processor to thereby determine when cyclic relationships corresponding to circular dependencies between nodes in the extracted portion and nodes that are not in the extracted portion exist in the metadata;

prior to performing a topological sort, when the processor determines that one or more cyclic relationships exist between nodes in the extracted portion and nodes that are not in the extracted portion in the metadata, the processor temporarily removing the one or more cyclic relationships between nodes in the extracted portion and nodes that are not in the extracted portion by temporarily removing edges that point from a node of the nodes in the extracted portion having a highest number of edges pointing to other nodes first, temporarily storing the removed edges and converting the cyclic directed graph to an acyclic directed graph;

topologically sorting the acyclic directed graph, by the processor of the computer in a first pass, to create a sorted listing of the nodes, wherein the sorted listing removes the temporarily removed edges having the one or more cyclic relationships between nodes in the extracted portion and nodes that are not in the extracted portion;

separating the original database so that the extracted portion of the original database identified in the metadata is removed from the original database to the separate database; and after separating the original database, the processor of the computer evaluating the sorted listing of nodes in a second pass to thereby restore the temporarily-stored edges having the one or more temporarily removed cyclic relationships.

2. The computer-implemented method of claim 1, further comprising:

determining at least one cycle in the cyclic directed graph based on a depth-first analysis, and wherein the converting the cyclic directed graph is based on the at least one cycle.

3. The computer-implemented method of claim 1, wherein the converting the cyclic directed graph comprises:

determining that at least one cycle of the cyclic directed graph can be broken; and selectively breaking the at least cycle of the cyclic directed graph by selectively removing an edge.

4. The computer-implemented method of claim 3, wherein the determining that at least one cycle can be broken is based on a number of references to objects participating in the at least one cycle.

5. The computer-implemented method of claim 3, wherein the converting the cyclic directed graph further comprises:

selectively storing the at least one cycle from the graph.

6. The computer-implemented method of claim 5, further comprising updating the sorted listing based on the stored at least one cycle.

7. The computer-implemented method of claim 1, further comprising mapping the metadata to the objects of the sorted listing, and generating a report that includes the metadata.

8. The computer-implemented method of claim 1, wherein the data source is a multi-tenant database.

9. The computer-implemented method of claim 1, further comprising making a copy of the metadata for an organization.

10. The computer-implemented method of claim 1 further comprising providing a report that includes the restored sorted listing of nodes remaining in the original database.

11. A computer program product for separating a portion of an original database maintained by a data source to a separate database, the computer program product comprising:

a tangible storage medium readable by a processing circuit and storing instructions for execution by the processing circuit for performing an automated process comprising:

receiving, by a computer, metadata of the original database from the data source, wherein the metadata describes an extracted portion of the original database that is being extracted to the separate database;

creating, by the processor of the computer, a cyclic directed graph of the original database based upon the metadata;

automatically identifying, by the processor of the computer based upon the cyclic directed graph, nodes in the metadata that represent objects and edges in the metadata that represent dependent relationships between the objects in the extracted portion of the original database;

automatically evaluating the edges of the cyclic directed graph by the processor to thereby determine when cyclic relationships corresponding to circular dependencies between nodes in the extracted portion and nodes that are not in the extracted portion exist in the metadata;

prior to performing a topological sort, when the processor determines that one or more cyclic relationships exist between nodes in the extracted portion and nodes that are not in the extracted portion in the metadata, the processor temporarily removing the one or more cyclic relationships between nodes in the extracted portion and nodes that are not in the extracted portion by temporarily removing edges that point from a node of the nodes in the extracted portion having a highest number of edges pointing to other nodes first, temporarily storing the removed edges and converting the cyclic directed graph to an acyclic directed graph;

topologically sorting the acyclic directed graph, by the processor of the computer in a first pass, to create a sorted listing of the nodes, wherein the sorted listing removes the temporarily removed edges having the one or more cyclic relationships between nodes in the extracted portion and nodes that are not in the extracted portion;

separating the original database so that the extracted portion of the original database identified in the metadata is removed from the original database to the separate database; and after separating the original database, the processor of the computer evaluating the sorted listing of nodes in a second pass to thereby restore the temporarily-stored edges having the one or more temporarily-removed cyclic relationships.

12. The computer program product of claim 11, wherein the processing the metadata comprises processing the metadata to determine a directed graph, and wherein the converting the graph comprises converting the directed graph from a cyclic directed graph to an acyclic directed graph.

13. The computer program product of claim 11, further comprising:

determining at least one cycle in the graph based on a depth-first analysis, and wherein the converting the cyclic directed graph is based on the at least one cycle.

14. The computer program product of claim 11, wherein the converting the cyclic directed graph comprises:

determining that at least one cycle of the cyclic directed graph can be broken; and selectively breaking the at least cycle of the cyclic directed graph by selectively removing an edge.

15. The computer program product of claim 14, wherein the converting the cyclic directed graph further comprises:

selectively storing the at least one cycle of the cyclic directed graph.

16. The computer program product of claim 15, wherein the determining that at least one cycle can be broken is based on a number of references to objects participating in the at least one cycle.

17. The computer program product of claim 12, wherein the converting the cyclic directed graph comprises:

determining that at least one cycle cannot be broken;

selectively removing the at least one cycle from the cyclic directed graph; and wherein the sorted listing is updated based on the removed at least one cycle.

18. The computer program product of claim 12 wherein the automated process further comprises providing a report that includes the restored sorted listing of nodes remaining in the original database.

* * * * *